United States Patent
Lee et al.

(10) Patent No.: US 11,792,821 B2
(45) Date of Patent: Oct. 17, 2023

(54) METHOD AND APPARATUS FOR PERFORMING SIDELINK RETRANSMISSION IN NR V2X

(71) Applicant: LG ELECTRONICS INC., Seoul (KR)

(72) Inventors: Seungmin Lee, Seoul (KR); Hanbyul Seo, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/966,311

(22) Filed: Oct. 14, 2022

(65) Prior Publication Data

US 2023/0050839 A1 Feb. 16, 2023

Related U.S. Application Data

(63) Continuation of application No. 17/716,742, filed on Apr. 8, 2022, now Pat. No. 11,477,816, which is a
(Continued)

(30) Foreign Application Priority Data

May 28, 2020 (KR) .......................... 10-2020-0064406
Aug. 24, 2020 (KR) .......................... 10-2020-0106362

(51) Int. Cl.
*H04W 72/14* (2009.01)
*H04W 72/23* (2023.01)
(Continued)

(52) U.S. Cl.
CPC ........... *H04W 72/23* (2023.01); *H04L 1/1812* (2013.01); *H04W 4/40* (2018.02)

(58) Field of Classification Search
CPC ... H04W 72/14; H04W 72/1289; H04W 4/40; H04L 1/1812
See application file for complete search history.

(56) References Cited

U.S. PATENT DOCUMENTS

2021/0136783 A1* 5/2021 Fakoorian ......... H04W 72/1278
2021/0250772 A1* 8/2021 Farag .................... H04W 74/08
(Continued)

FOREIGN PATENT DOCUMENTS

CN    110545534 A    12/2019

OTHER PUBLICATIONS

Intel Corporation, "Outcome of email thread [100e-NR-5G_V2X_NRSL-RA_Mode2-02]", R1-2001345, 3GPP TSG RAN WG1 Meeting#100, e-Meeting, Mar. 11, 2020, Sections 1-3.
(Continued)

*Primary Examiner* — Walli Z Butt
(74) *Attorney, Agent, or Firm* — BRYAN CAVE LEIGHTON PAISNER LLP

(57) ABSTRACT

A method by which a first device performs sidelink communication is provided. The method comprises the steps of: receiving, from a base station, a sidelink grant associated with a first retransmission resource and an initial transmission resource of a transport block; transmitting, to a second device, a PSCCH and a PSSCH associated with the PSCCH, on the basis of the initial transmission resource; determining a PSFCH resource for receiving a PSFCH from the second device, on the basis of the index of a slot and the index of a subchannel associated with the PSSCH; receiving, from the second device, the PSFCH on a first PSSCH, on the basis of the PSFCH resource; comparing a time interval between the PSFCH resource and the first retransmission resource
(Continued)

with a minimum processing time required between the reception of the PSFCH and retransmission of the transport block.

20 Claims, 19 Drawing Sheets

Related U.S. Application Data continuation of application No. PCT/KR2021/004577, filed on Apr. 12, 2021.

(60) Provisional application No. 63/070,237, filed on Aug. 25, 2020, provisional application No. 63/069,147, filed on Aug. 23, 2020, provisional application No. 63/068,825, filed on Aug. 21, 2020, provisional application No. 63/030,896, filed on May 27, 2020, provisional application No. 63/005,488, filed on Apr. 6, 2020.

(51) Int. Cl.
*H04L 1/1812* (2023.01)
*H04W 4/40* (2018.01)

(56) References Cited

U.S. PATENT DOCUMENTS

2021/0288778 A1\* 9/2021 Park .................. H04L 1/1858
2021/0297971 A1\* 9/2021 Hosseini ........... H04W 56/0045

OTHER PUBLICATIONS

Ericsson, "Feature lead summary #4 on Resource allocation for NR sidelink Mode 1", R1-2001367, 3GPP TSG RAN WG1 Meeting#100, e-Meeting, Mar. 6, 2020, Sections 1-3.
CAICT, "On PSFCH of NR sidelink", R1-2001045, 3GPP TSG RAN WG1 Meeting#100, e-Meeting, Feb. 14, 2020, Sections 1-3.
LG Electronics, "Feature lead summary #2 for AI 7.2.4.5 Physical layer procedures for sidelink" R1-2001338, 3GPP TSG RAN WG1 Meeting#100, e-Meeting, Mar. 6, 2020, Sections 1-3.
U.S. Appl. No. 17/716,742, filed Apr. 8, 2022.

\* cited by examiner

FIG. 10
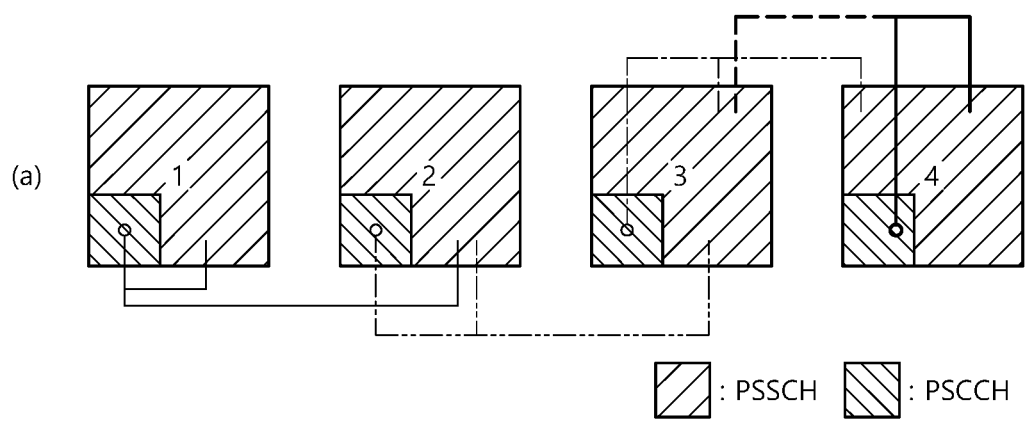
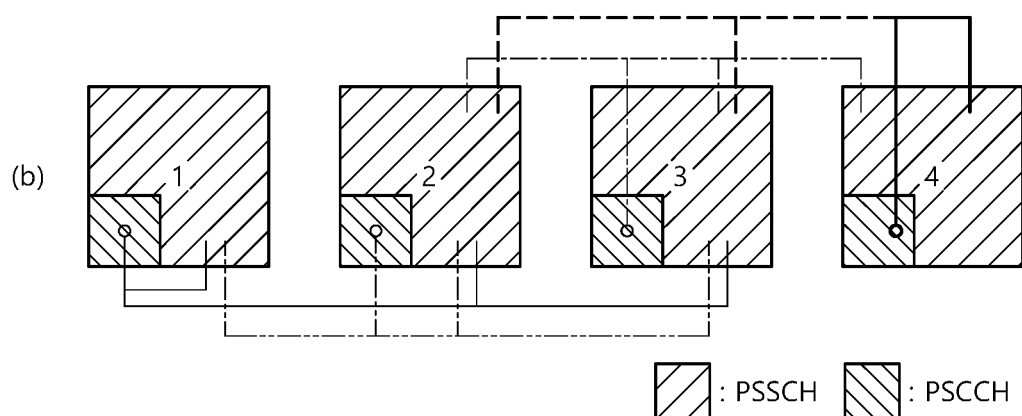
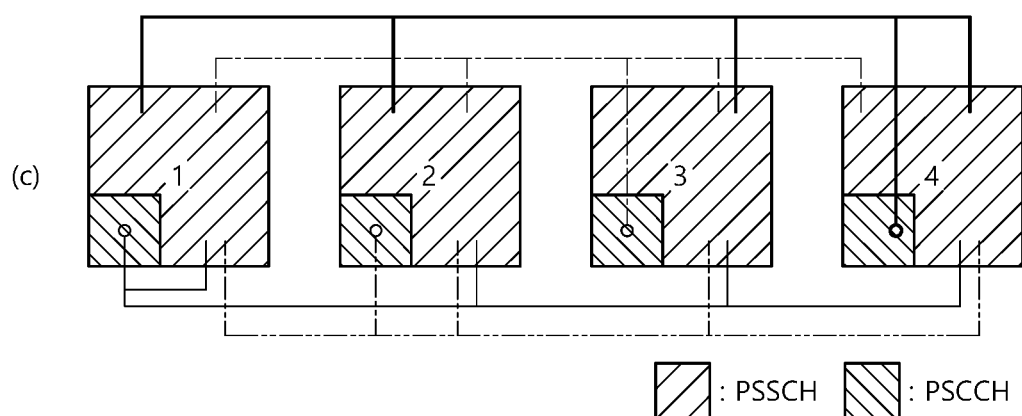

METHOD AND APPARATUS FOR PERFORMING SIDELINK RETRANSMISSION IN NR V2X

This application is a Continuation Application of U.S. patent application Ser. No. 17/716,742, filed on Apr. 8, 2022, which is a Continuation of International Application No. PCT/KR2021/004577, filed on Apr. 12, 2021, which claims priority to Korean Patent Application No(s). 10-2020-0064406, filed on May 28, 2020 and 10-2020-0106362, filed on Aug. 24, 2020 and U.S. Provisional Application No. 63/008,488, filed on Apr. 10, 2020; 63/030,896, filed on May 27, 2020; 63/068,825, filed on Aug. 21, 2020; 63/069,147, filed on Aug. 23, 2020 and 63/070,237, filed on Aug. 25, 2020, the contents of which are hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY OF THE DISCLOSURE

Technical Objects

An object of the present disclosure is to provide a sidelink (SL) communication method between devices (or UEs) and a device (or UE) for performing the same.

Another object of the present disclosure is to provide a method for performing sidelink retransmission in NR V2X and a device (or UE) for performing the same.

Another object of the present disclosure is to provide a method for performing sidelink communication based on a comparison of the minimum processing time between the PSFCH resource and the retransmission resource with the actual time interval in NR V2X and a device (or UE) for performing the same.

Technical Solutions

According to an embodiment of the present disclosure, a method for performing sidelink communication by a first device may be provided. The method may include receiving, from a base station, a sidelink grant related to an initial transmission resource and a first retransmission resource of a transport block, transmitting, to a second device, a Physical Sidelink Control Channel (PSCCH) and a Physical Sidelink Shared Channel (PSSCH) related to the PSCCH, based on the initial transmission resource, determining a Physical Sidelink Feedback Channel (PSFCH) resource for receiving a PSFCH from the second device based on an index of a slot and an index of a subchannel related to the PSSCH, receiving, from the second device, the PSFCH related to the first PSSCH based on the PSFCH resource, comparing a time interval between the PSFCH resource and the first retransmission resource with a minimum processing time required between reception of the PSFCH and retransmission of the transport block, and performing sidelink communication with the second device based on comparison of the time interval and the minimum processing time. The transport block may be a transport block for which a sidelink Hybrid Automatic Repeat Request (HARQ) feedback is enabled. Based on the time interval being less than the minimum processing time, the retransmission of the transport block on the first retransmission resource may be dropped by the first device.

According to an embodiment of the present disclosure, a first device configured to perform sidelink communication may be provided. The first device may include at least one memory storing instructions, at least one transceiver, and at least one processor connecting the at least one memory and the at least one transceiver. The at least one processor may be configured to control the at least one transceiver to receive, from a base station, a sidelink grant related to an initial transmission resource and a first retransmission resource of a transport block, control the at least one transceiver to transmit, to a second device, a Physical Sidelink Control Channel (PSCCH) and a Physical Sidelink Shared Channel (PSSCH) related to the PSCCH, based on the initial transmission resource, determine a Physical Sidelink Feedback Channel (PSFCH) resource for receiving a PSFCH from the second device based on an index of a slot and an index of a subchannel related to the PSSCH, control the at least one transceiver to receive, from the second device, the PSFCH related to the PSSCH based on the PSFCH resource, compare a time interval between the PSFCH resource and the first retransmission resource with a minimum processing time required between reception of the PSFCH and retransmission of the transport block, and control the at least one transceiver to perform sidelink communication with the second device based on comparison of the time interval and the minimum processing time. The transport block may be a transport block for which a sidelink Hybrid Automatic Repeat Request (HARQ) feedback is enabled. Based on the time interval being less than the minimum processing time, the retransmission of the transport block on the first retransmission resource may be dropped by the first device.

Effects of the Disclosure

The user equipment (UE) can efficiently perform SL communication.

BRIEF DESCRIPTION OF THE DRAWINGS

FIG. 10 shows a method in which a UE that has reserved transmission resource(s) informs another UE of the transmission resource(s), based on an embodiment of the present disclosure.

DESCRIPTION OF EXEMPLARY EMBODIMENTS

Figure 1:
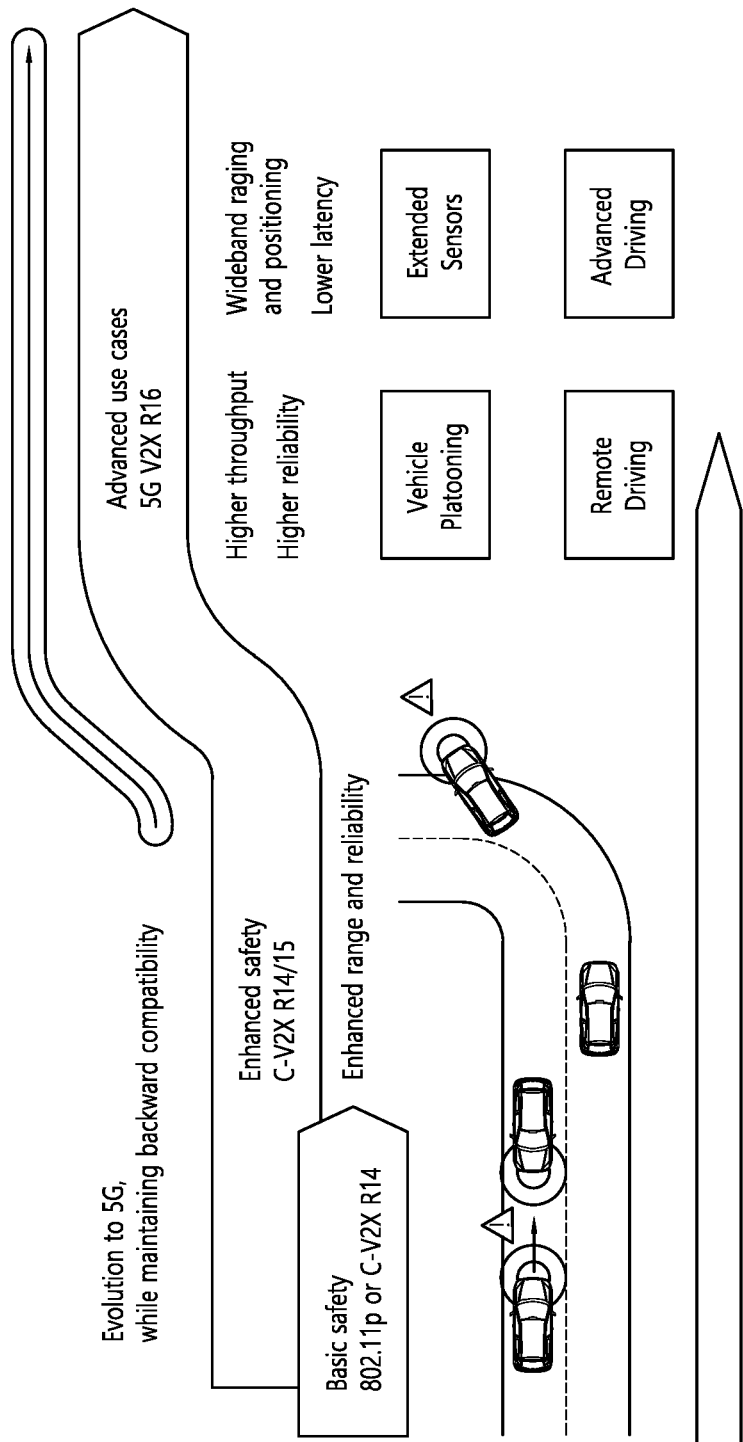
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
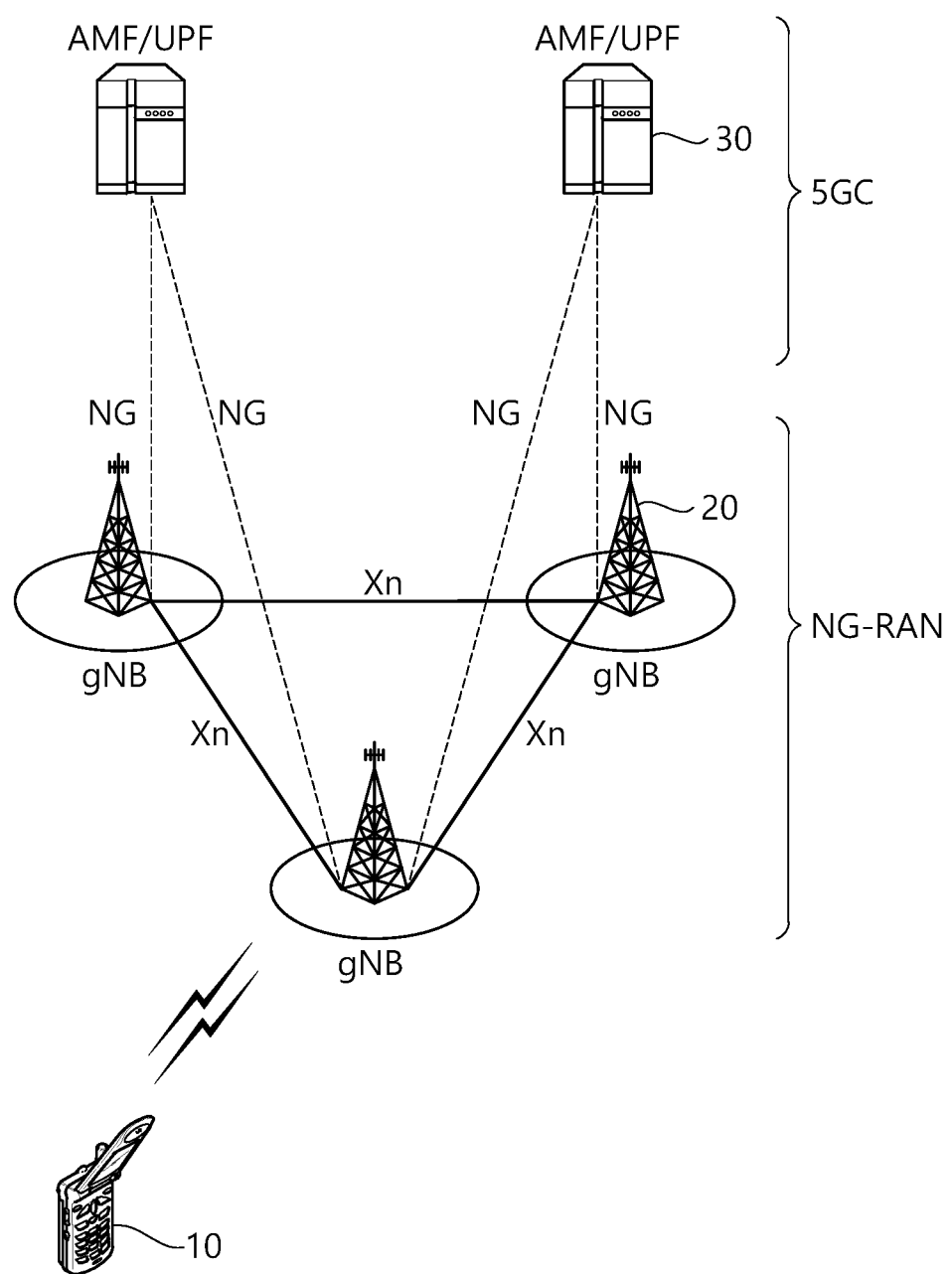
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
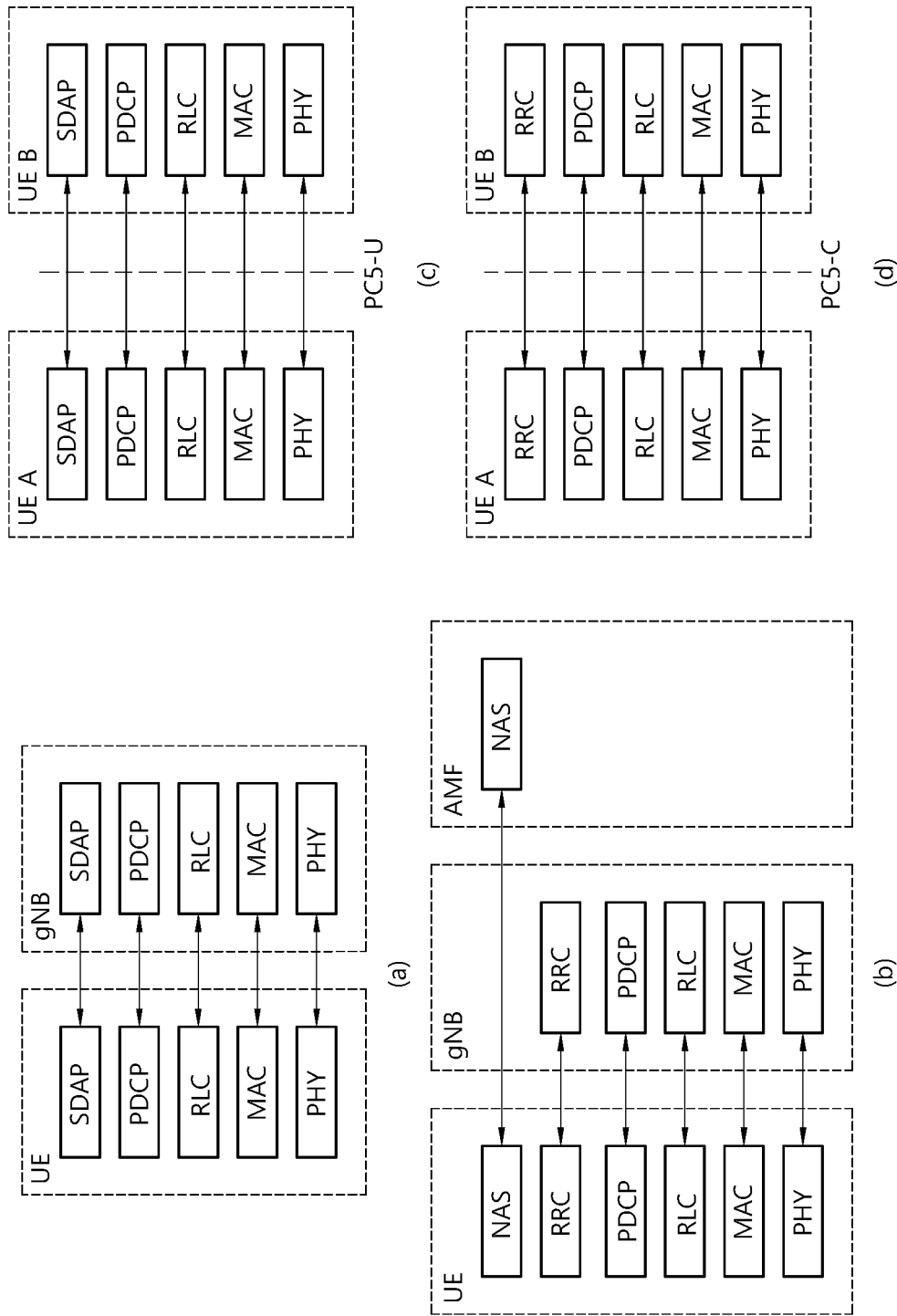
FIG. 3 shows a radio protocol architecture, based on an embodiment of the present disclosure.

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
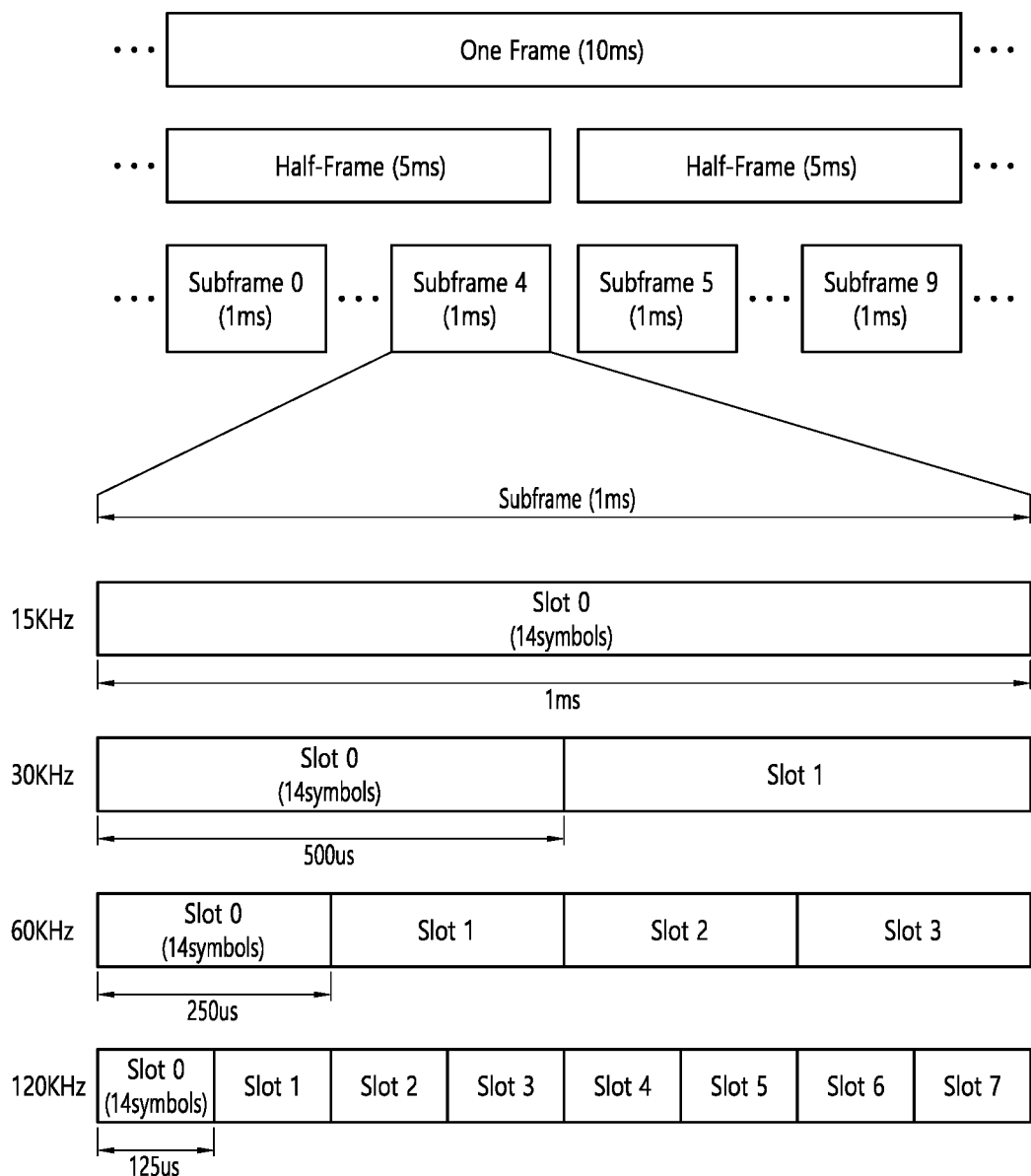
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz–6000 MHz | 15, 30, 60 kHz |
| FR2 | 24250 MHz–52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz–7125 MHz | 15, 30, 60 kHz |
| FR2 | 24250 MHz–52600 MHz | 60, 120, 240 kHz |

Figure 5:
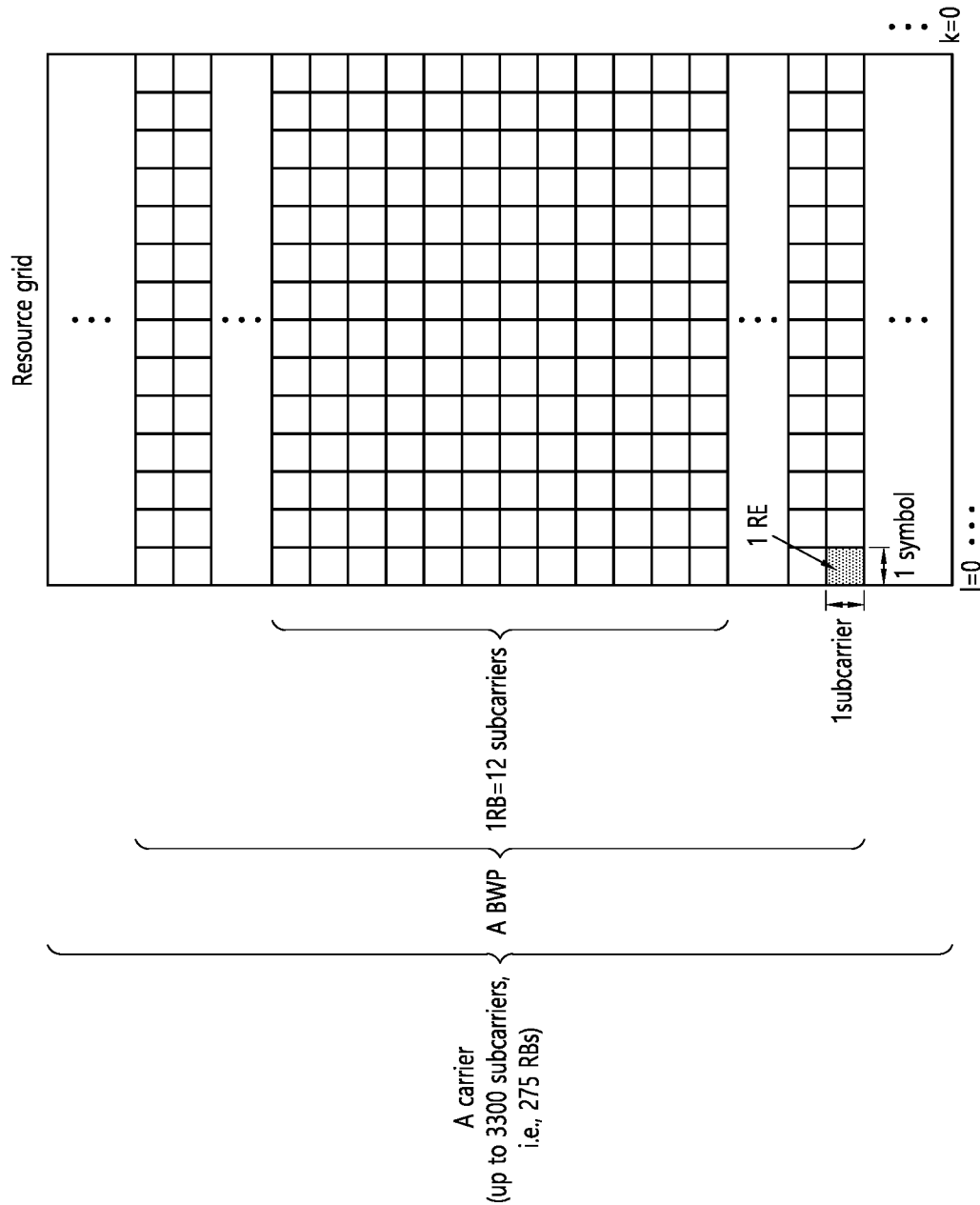
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
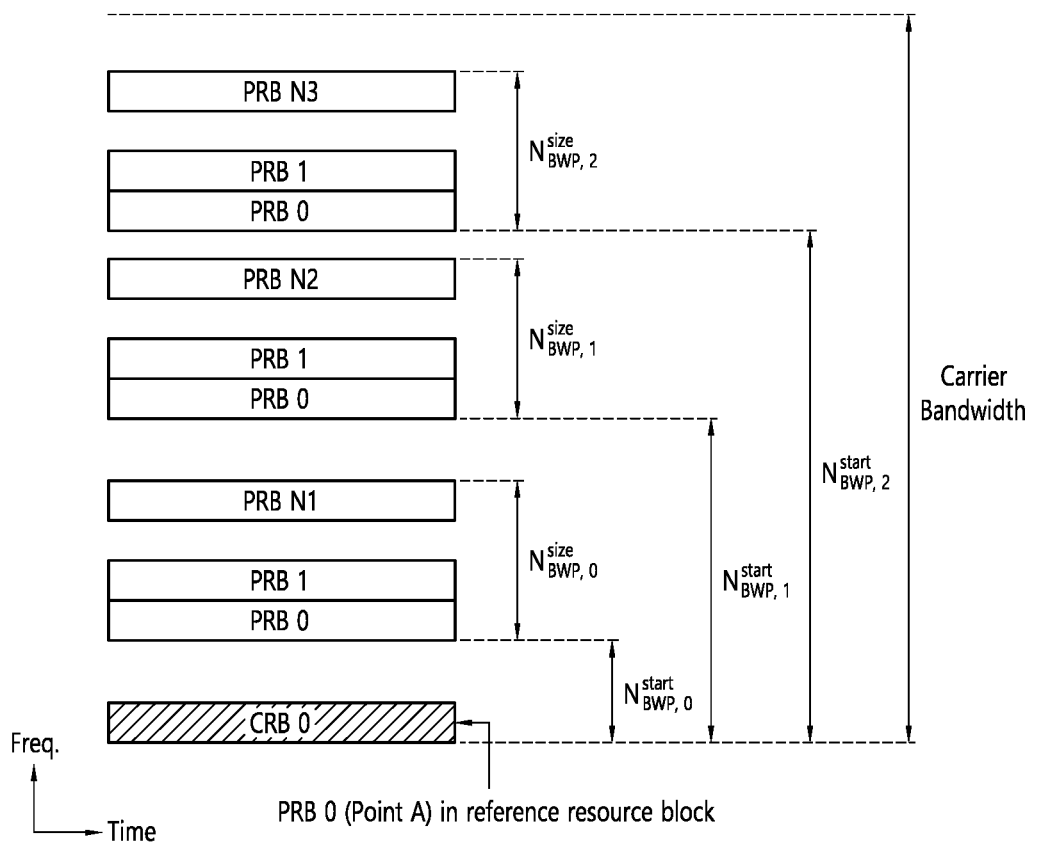
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
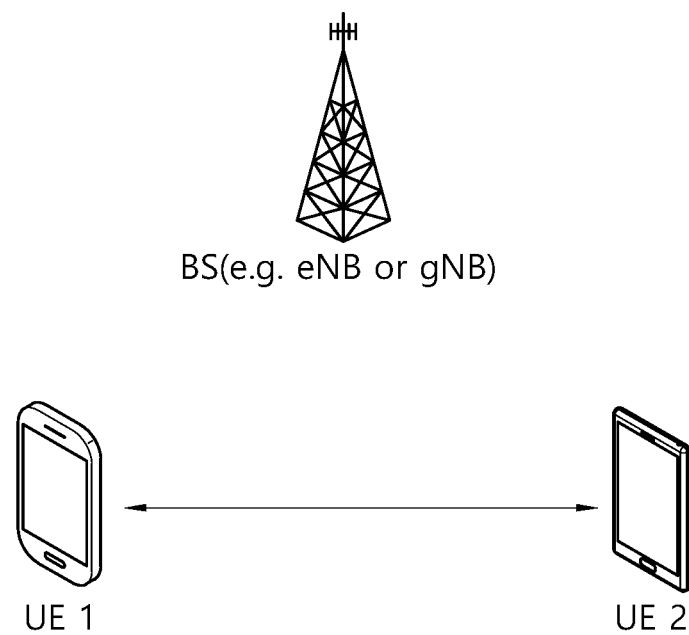
FIG. 7 shows a UE performing V2X or SL communication, based on an embodiment of the present disclosure.

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
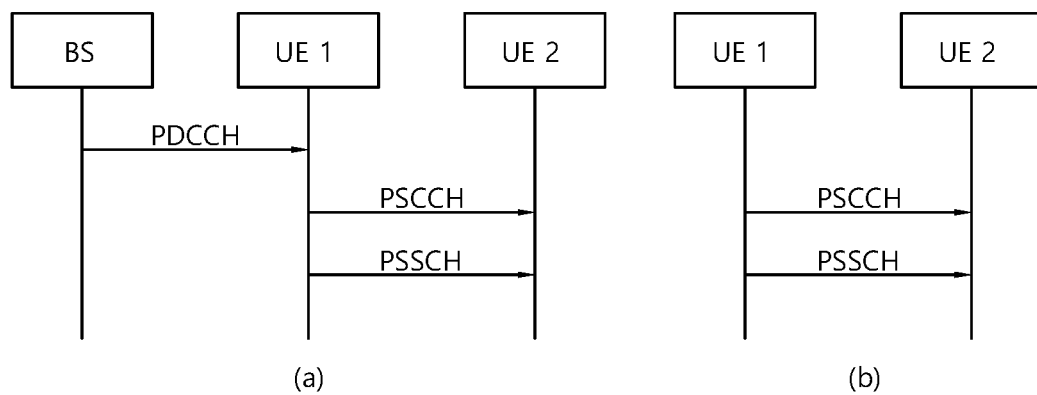
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
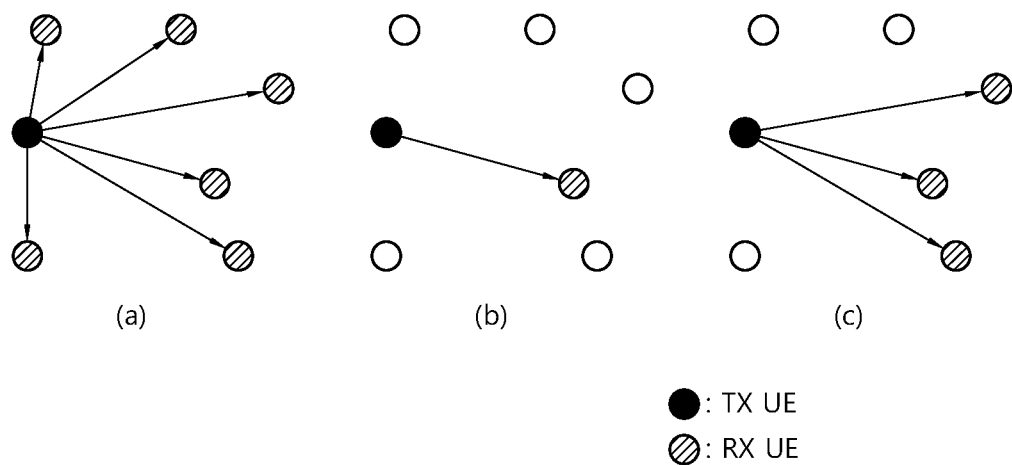
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in NR V2X communication or NR sidelink communication, a transmitting UE may reserve/select one or more transmission resources for sidelink transmission (e.g., initial transmission and/or retransmission), and the transmitting UE may transmit information on the location of the one or more transmission resources to receiving UE(s).

Meanwhile, when performing sidelink communication, a method for a transmitting UE to reserve or pre-determine transmission resource(s) for receiving UE(s) may be representatively as follows.

For example, the transmitting UE may perform a reservation of transmission resource(s) based on a chain. Specifically, for example, if the transmitting UE reserves K transmission resources, the transmitting UE may transmit location information for less than K transmission resources to receiving UE(s) through a SCI transmitted to the receiving UE(s) at any (or specific) transmission time or a time resource. That is, for example, the SCI may include location information for less than the K transmission resources. Alternatively, for example, if the transmitting UE reserves K transmission resources related to a specific TB, the transmitting UE may transmit location information for less than K transmission resources to receiving UE(s) through a SCI transmitted to the receiving UE(s) at any (or specific) transmission time or a time resource. That is, the SCI may include location information for less than the K transmission resources. In this case, for example, it is possible to prevent performance degradation due to an excessive increase in payloads of the SCI, by signaling only the location information for less than K transmission resources to the receiving UE(s) through one SCI transmitted at any (or specific) transmission time or the time resource by the transmitting UE.

FIG. 10 shows a method in which a UE that has reserved transmission resource(s) informs another UE of the transmission resource(s), based on an embodiment of the present disclosure. The embodiment of FIG. 10 may be combined with various embodiments of the present disclosure.

Specifically, for example, (a) of FIG. 10 shows a method for performing by a transmitting UE chain-based resource reservation by transmitting/signaling location information of (maximum) 2 transmission resources to receiving UE(s) through one SCI, in the case of a value of K=4. For example, (b) of FIG. 10 shows a method for performing by a transmitting UE chain-based resource reservation by transmitting/signaling location information of (maximum) 3 transmission resources to receiving UE(s) through one SCI, in the case of a value of K=4. For example, referring to (a) and (b) of FIG. 10, the transmitting UE may transmit/signal only location information of the fourth transmission-related resource to the receiving UE(s) through the fourth (or last) transmission-related PSCCH. For example, referring to (a) of FIG. 10, the transmitting UE may transmit/signal to the receiving UE(s) not only location information of the fourth transmission-related resource but also location information of the third transmission-related resource additionally through the fourth (or last) transmission-related PSCCH. For example, referring to (b) of FIG. 10, the transmitting UE may transmit/signal to the receiving UE(s) not only location information of the fourth transmission-related resource but also location information of the second transmission-related resource and location information of the third transmission-related resource additionally through the fourth (or last) transmission-related PSCCH. In this case, for example, in (a) and (b) of FIG. 10, if the transmitting UE may transmit/signal to the receiving UE(s) only location information of the fourth transmission-related resource through the fourth (or last) transmission-related PSCCH, the transmitting UE may set or designate a field/bit of location information of unused or remaining transmission resource(s) to a pre-configured value (e.g., 0). For example, in (a) and (b) of FIG. 10, if the transmitting UE may transmit/signal to the receiving UE(s) only location information of the fourth transmission-related resource through the fourth (or last) transmission-related PSCCH, the transmitting UE may be set or designate a field/bit of location information of unused or remaining transmission resource(s) to a pre-configured status/bit value indicating/representing the last transmission (among 4 transmissions).

Meanwhile, for example, the transmitting UE may perform a reservation of transmission resource(s) based on a block. Specifically, for example, if the transmitting UE reserves K transmission resources, the transmitting UE may transmit location information for K transmission resources to receiving UE(s) through a SCI transmitted to the receiving UE(s) at any (or specific) transmission time or a time resource. That is, the SCI may include location information for K transmission resources. For example, if the transmitting UE reserves K transmission resources related to a specific TB, the transmitting UE may transmit location information for K transmission resources to receiving UE(s) through a SCI transmitted to the receiving UE(s) at any (or specific) transmission time or a time resource. That is, the SCI may include location information for K transmission resources. For example, (c) of FIG. 10 shows a method for performing by the transmitting UE block-based resource reservation, by signaling location information of 4 transmission resources to receiving UE(s) through one SCI, in the case of a value of K=4.

Figure 11:
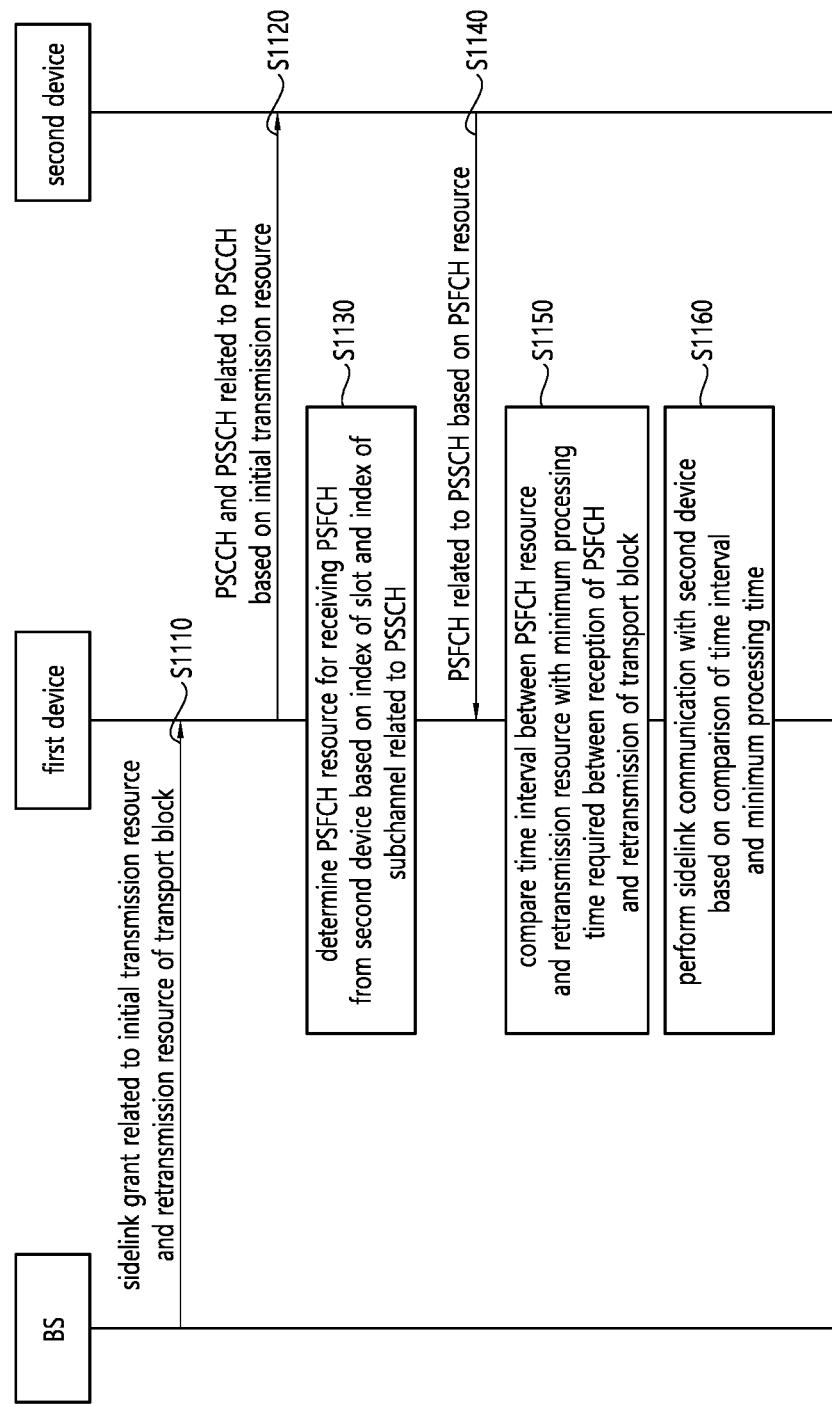
FIG. 11 illustrates a method for a first device to perform sidelink communication with a second device based on a sidelink grant received from a base station, according to an embodiment of the present disclosure.

FIG. 11 illustrates a method for a first device to perform sidelink communication with a second device based on a sidelink grant received from a base station, according to an embodiment of the present disclosure.

In step S1110, the first device according to an embodiment may receive, from the base station, a sidelink grant related to an initial transmission resource and a retransmission resource of a transport block. In step S1120, the first device may transmit the PSCCH and the PSSCH related to the PSCCH based on the initial transmission resource. In step S1130, the first device may determine a PSFCH resource for receiving the PSFCH from the second device based on the index of the slot and the index of the subchannel related to the PSSCH. In step S1140, the first device may receive the PSFCH related to the PSSCH based on the PSFCH resource. In step S1150, the first device may compare the time interval between the PSFCH resource and the retransmission resource with the minimum processing time required between the reception of the PSFCH and the retransmission of the transport block. In step S1160, the first device may perform sidelink communication with the second device based on the comparison of the time interval and the minimum processing time.

Hereinafter, embodiments and/or examples that may be directly or indirectly related to at least one of steps S1110 to S1160 will be considered. Meanwhile, the following embodiments and/or examples may only be related to at least one of steps S1110 to S1160, and therefore, even if at least one of the following embodiments and/or examples and steps S1110 to S1160 are mutually contradicted in content, the contradicted content should not be construed as deviating from the scope of the present specification.

[Proposed method #1]: As an example, according to the (some) rules below, it may be configured to perform MODE 1 operation. In addition, as an example, whether the proposed method of the present disclosure is applied and related parameters may be configured differently according to MODE 1 CG (and/or MODE 1 DG), service type (and/or priority), Quality Of Service (QOS) requirements (e.g., latency, reliability), cast type (e.g., unicast, groupcast, broadcast), HARQ feedback option (e.g., (TX-RX distance based) NACK ONLY feedback, ACK/NACK feedback), etc.

For example, during the MODE 1 CG operation, the UE may report the remaining value among the maximum allowed number of retransmissions (MAX_RENUM) related to TB configured in the form of "PER PRIORITY PER CG" (and/or "PER HARQ PROCESS ID") to the base station (through predefined signaling (e.g., PUCCH, PUSCH)). Here, as an example, the report may consist of information such as the remaining number of retransmissions and/or (related) HARQ PROCESS ID and/or (related) CG INDEX and/or (related) (service/traffic) PRIORITY. When the above rule is applied, for example, the base station can reduce the waste of additional retransmission resource allocation through DG DCI.

For example, (above-described) MAX_RENUM may be shared between a retransmission operation based on CG resource and a retransmission operation based on a retransmission resource additionally allocated through DG DCI (linked with a CG resource). Here, as an example, when the corresponding rule is applied, service-related QOS requirements (e.g., RELIABILTY) can be efficiently satisfied.

For example, the SIZE ALIGNMENT operation between MODE 1 DCI and UU DCI is not applied, if the used UU DCI FORMAT SIZE BUDGET (e.g., the total number is 4 or less, but at the same time, the different DCI FORMAT SIZE scrambled with C-RNTI needs to be 3 or less) is less than 4 (and/or if the size budget related to UU DCI FORMAT scrambled with C-RNTI being used is less than 3 (e.g., the SIZE FITTING target of MODE 1 DCI may be limited to UU DCI FORMAT scrambled with C-RNTI) and/or if the remaining size budget (i.e., 1) except for the (maximum) size budget related to the UU DCI FORMAT scrambled with C-RNTI is not used (e.g., the size fitting target of MODE 1 DCI may be limited to the remaining UU DCI FORMAT except for the UU DCI FORMAT scrambled with C-RNTI)).

Otherwise, after selecting the UU DCI FORMAT (scrambled with C-RNTI or not scrambled with C-RNTI) that requires the least ZERO PADDING from the viewpoint of MODE 1 DCI, size alignment operation may be applied between the UU DCI FORMAT and MODE 1 DCI, or, after selecting the UU DCI FORMAT (scrambled with C-RNTI or not scrambled with C-RNTI) with the smallest size difference between MODE 1 DCI and UU DCI FORMAT, the size of a DCI having a relatively small size may be fitted with the maximum value among the corresponding UU DCI FORMAT size and the MODE 1 DCI size. Here, as an example, when the above rule is applied, if the required total number of blind decodings (and/or the total number of NON-OVERLAPPED CCEs related to channel estimation) (on one slot) exceeds the (pre-configured) maximum allowed number, it may be handled according to the conventional UU rule. Also, as an example, the above rule may be (limitedly) applied only when the (specific) UU DCI format previously designated is not configured to be monitored as the (mutual) size fitting target of the MODE 1 DCI.

For example, the resource reservation period field size on SCI is fixed to 4 bits, and the number of resource reservation period candidates configurable by the base station/network specifically for the MODE 2 resource pool (and/or MODE 2 UE) is greater than 16. As an example, when different TX pools (e.g., MODE 1/2 TX pool) overlap (and/or when MODE 1 UE and MODE 2 UE coexist on the same TX pool), if the understanding/interpretation of the resource reservation period value on the SCI is not matched between TX UEs based on different TX pools (or TX UEs based on different MODEs), sensing and resource exclusion operations cannot be efficiently performed. Considering this, as an example, even when configuring the MODE 1 resource pool, the resource reservation period candidate values (e.g., up to 16) allowed (on the corresponding resource pool) may be signaled (by the base station/network). Here, as an example, when the corresponding rule is applied, the MODE 1 CG resource-related reservation period value may be (limitedly) selected only from the resource reservation period candidate values configured specifically for the MODE 1 resource pool. In addition, as an example, when the above-described rule is applied, the MODE 1 CG type 1 resource-related (physical slot) offset value (compared to SFN 0) may be configured to one value in the range from "0" to "the maximum value (MS) among the resource reservation period candidates configured in the MODE 1 resource pool−1".

For example, if different HARQ PROCESS ID allocation (e.g., RRC) is possible between MODE 1 CGs, the CG index field on DG DCI (ADRSC_DCI) related to the additional retransmission resource allocation may not be needed. In this case, as an example, size fitting may be applied between ADRSC_DCI and MODE 1 CG Type 2 ACTIVATION (and/or RELEASE) DCI.

For example, when configuring the MODE 1 CG resource, a resource related to a specific CG period (PERIOD) #X may be located in another (adjacent) CG period #Y. Here, as an example, when the corresponding rule is applied, (some or all) resources related to different CG periods may be configured not to overlap (in the time domain). As another example, when (some or all) resources related to different CG periods overlap (in the time domain), packet transmission of a relatively low priority (and/or a relatively preceding (or trailing) period in the time domain) and a related CG resource may be considered to be dropped.

For example, it may be allowed for the TX UE to select only a part from among the configured MODE 1 CG resources (e.g., signaling on the SCI is longer than the CG resource reservation period configured by the base station, and signaling on the SCI is smaller than the CG frequency resource size configured by the base station), and to signal related information to other UEs by SCI.

[Proposed method #2]: As an example, if a pre-configured UU communication (e.g., communication between the base station and the UE) (USS (or CSS)) (NON-FALLBACK (or FALLBACK)) DCI FORMAT (e.g. DCI FORMAT 0_1 (or DCI FORMAT 0_0)) (REF_DCI) that matches the payload size of DCI FORMAT (related to NR SL MODE 1 (and/or LTE SL MODE 3 SPS scheduled by NR UU)) (e.g. DCI FORMAT 3_0 and/or DCI FORMAT 3_1) (SL_DCI) does not exist/monitored (on the same search space (and/or CORESET)), for SL_DCI, a size fitting operation may be performed with the smallest difference in payload size with SL_DCI among existing/monitored (USS (or CSS)) (non-Fallback (or fallback)) DCI FORMATs related to UU communication (or (fallback (or non-fallback)) DCI FORMAT related to UU communication pre-configured on USS (or CSS) (e.g., DCI FORMAT 0_0)). Here, as an example, the corresponding rule may be limitedly applied only when the DCI format size budget of the UE is already used due to the (USS or CSS) DCI FORMAT related to UU communication.

[Proposed method #3]: As an example, (when operating SL MODE 1, if multiple resource pools are configured) the (associated) resource pool (index) information field may be defined only on (SL-RNTI (and/or SL-CS-RNTI)-based) SL MODE 1 DG DCI FORMAT (e.g., it may be limited to the case of being performed through SL MODE 1 DG from the initial transmission) (e.g., DCI FORMAT 3_0), and/or the base station/network may inform the UE of the resource pool information associated with the above-described SL MODE 1 DG DCI FORMAT through predefined signaling (e.g., RRC) (e.g., (associated) resource pool (index) information field does not need to be defined on the (above-described) DCI FORMAT). In addition, as an example, the (above-described) resource pool (index) information field may not be defined on SL CROSS-RAT DCI FORMAT (e.g., DCI FORMAT 3_1) used when NR UU schedules LTE SL MODE 3 SPS, and/or, although the corresponding field exists, it may be designated (e.g., for virtual CRC use) as a pre-configured value (e.g., 0).

[Proposed method #4]: As an example, from the TX UE perspective (for a specific TB), the minimum processing time value (MIN_PR) required between PSFCH reception (from RX UE) and PSCCH/PSSCH retransmission may be defined. Here, as an example, during MODE 1 operation, the UE may expect the base station to allocate/schedule a retransmission resource that satisfies MIN_PR between PSFCH reception and PSCCH/PSSCH retransmission only when the (some of) following conditions are satisfied (for the same TB).

For example, being allocated/scheduled a MODE 1 CG SL grant to which at least one logical channel (LCH) for which HARQ feedback is enabled is mapped (and/or when a MODE 1 CG SL grant in which all allocated LCHs have characteristics of HARQ feedback enabled is allocated/scheduled) may be one condition.

And/or, for example, a case where a MODE 1 DG SL grant (and/or a MODE 1 CG SL grant) is allocated/scheduled (and/or when a MODE 1 SL grant is allocated/scheduled for a resource pool in which PSFCH is configured (or not configured) and/or when the PUCCH resource is configured (or not configured) for the MODE 1 SL grant) may be one condition.

As another example, when a MODE 1 CG SL grant in which all allocated LCHs have characteristics of HARQ feedback DISABLED is allocated/scheduled (and/or when a MODE 1 DG SL grant is allocated/scheduled and/or when a MODE 1 SL grant is configured/scheduled for a resource pool in which PSFCH is not configured (or configured) and/or when the PUCCH resource is not configured (or configured) for the MODE 1 SL grant), exceptionally, it may be configured so that the UE does not expect the base station to allocate/schedule a retransmission resource satisfying MIN_PR between PSFCH reception and PSCCH/PSSCH retransmission (for the same TB). As an example, when the UE is allocated/scheduled by the base station a MODE 1 SL grant having (part or all) retransmission resources that do not satisfy MIN_PR between PSFCH reception and PSCCH/PSSCH retransmission (for the same TB), it may be possible not to perform MAC PDU transmission for which HARQ feedback (based on data related to LCH with HARQ feedback enabled) is required/requested for related resources (and/or MODE 1 SL grant) (and/or to perform only MAC PDU transmission for which blind retransmission (based on data related to LCH with HARQ feedback disabled) is required/requested). In addition, as an example, when a MODE 1 SL grant having retransmission resources satisfying MIN_PR between PSFCH reception and PSCCH/PSSCH retransmission is allocated/scheduled (for the same TB) from the base station, and although it was used for MAC PDU transmission for which HARQ feedback is required/requested (based on data related to LCH with HARQ feedback enabled), but if the additionally allocated retransmission resource (through DG) does not satisfy the MIN_PR between PSFCH reception and PSCCH/PSSCH retransmission, it may be configured to omit the (remaining) related TB (re)transmission (and/or BLIND retransmission). In addition, as an example, (for the resource pool in which the PSFCH resource is configured and/or when there is an intention to perform service (and/or LCH)-related transmission requiring retransmission based on HARQ feedback) the TX UE may expect the base station to allocate/schedule at least one of the MODE 1 CG grants (and/or DG grants) to satisfy the MIN_PR between PSFCH reception and PSCCH/PSSCH retransmission (and/or to have PUCCH resources). As an additional example, (unlike MODE 1 CG) it may (always) be expected to be allocated/scheduled MODE 1 DG (for the resource pool in which the PSFCH is configured) satisfying the MIN_PR between PSFCH reception and PSCCH/PSSCH retransmission. As an example, in the case of DG (and/or CG), if the TX UE reports only data information (e.g., buffer status report (BSR), (predicted) TRAFFIC GENERATION PERIOD/SIZE, etc.) related to the LCH in which HARQ feedback is enabled to the base station (and/or reporting including data information related to the (at least one) LCH with HARQ feedback enabled), it may be expected that a retransmission resource satisfying MIN_PR between PSFCH reception and PSCCH/PSSCH retransmission is allocated/scheduled. In addition, as an example, whether the proposed method of the present disclosure is applied and related parameters may be configured differently according to MODE 1 CG (and/or MODE 1 DG), service type (and/or priority), QOS requirements (e.g., latency, reliability), cast type (e.g., unicast, groupcast, broadcast), HARQ feedback option (e.g., (TX-RX distance based) NACK ONLY feedback, ACK/NACK feedback), (resource pool) congestion level (e.g., CBR), whether PUCCH based SL HARQ report is configured or not (e.g., in the case of MODE 1 GRANT in which the PUCCH resource is configured, the proposed method may be applied). As an additional example, the following (some) rules may be configured to be applied.

[Proposed method #5]: As an example, meanwhile, in the form of a sidelink CSI reference resource, the length of the PSSCH symbol interval may be a value excluding the PSCCH symbol period and/or AGC symbol (first symbol in the SL slot) and/or TX-RX switching symbol (last symbol in the SL slot) from the number of SL symbols in the SL slot. For example, the length of the PSCCH symbol interval may be a (pre-)configured value for a resource pool triggering CSI reporting, or may be a specific fixed value (e.g., 2 or 3). For example, since the AGC symbol is also actually transmitted, it may not be excluded from the length of the reference PSSCH symbol interval. Alternatively, for example, since the value may be excessive if the PSCCH overhead is excluded in units of symbols, the total symbol overhead value may be configured to 3 for all or some of the plurality of overheads. That is, the length of the PSSCH symbol interval in the SL CSI reference resource may be a value obtained by subtracting 3 from the number of SL symbols in the SL slot.

[Proposed method #6]: As an example, meanwhile, it may be considered that PUCCH is transmitted through the SCell (hereinafter, PUCCH SCell), and at this time, whether the SL HARQ-ACK report for SL CG type 1 is transmitted through the PCell or the PUCCH SCell needs to be defined/configured. For example, a cell in which the SL HARQ-ACK report or PUCCH is transmitted may be determined according to a UL carrier associated with an SL carrier in which an SL resource of SL CG type 1 is transmitted. For example, the UL carrier may also be associated with a specific DL carrier, the DL carrier may also belong to a specific cell group, and according to the PUCCH cell corresponding to the corresponding cell group, the SL HARQ-ACK report of SL CG type 1 or the PUCCH may be transmitted to the corresponding cell. The DL carrier may be associated with the UL carrier based on same-carrier-scheduling, or may be a scheduling cell configured for the UL carrier in cross-slot-scheduling. Meanwhile, the SL carrier may be an ITS carrier, and in this case, there may be no cell group information associated with corresponding carrier. For example, when SL CG type 1 is transmitted in the ITS band, SL HARQ-ACK report or PUCCH may be transmitted to PCell (and/or PSCell and/or PUCCH SCell and/or pre-configured cell (from among PCell, PSCell, PUCCH SCell)). Meanwhile, when PUCCH transmission is configured for SL CG type 1, the UE may expect to receive DCI for allocating a retransmission resource for a corresponding CG resource from a specific DL carrier again. For example, the cell in which the SL HARQ-ACK report or PUCCH for SL CG type 1 is to be transmitted may be determined based on the DL carrier or cell in which the retransmission DCI for the corresponding CG resource is transmitted. For example, the cell in which the SL HARQ-ACK report or PUCCH for SL CG type 1 is to be transmitted may be determined according to a cell group associated with a DL carrier in which the retransmission DCI for the corresponding CG resource is transmitted. For example, the cell in which the SL HARQ-ACK report or PUCCH for SL CG type 1 is to be transmitted may be determined according to a DL cell in which RRC information for a corresponding CG resource is transmitted. For example, the cell in which the SL HARQ-ACK report or PUCCH is to be transmitted may be determined according to a cell group associated with a DL cell in which RRC information for a corresponding CG resource is transmitted.

Figure 12:
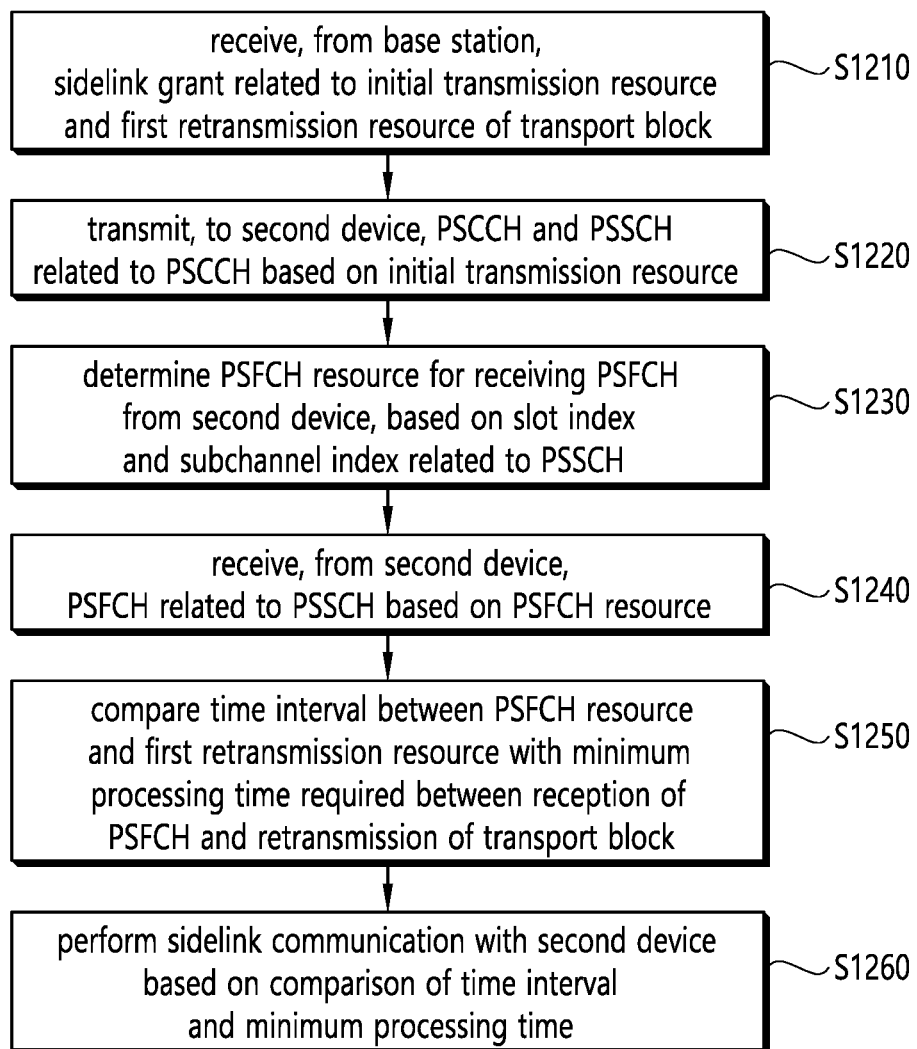
FIG. 12 is a flowchart illustrating a method for a first device to perform sidelink communication according to an embodiment of the present disclosure.

FIG. 12 is a flowchart illustrating a method for a first device to perform sidelink communication according to an embodiment of the present disclosure.

The operations disclosed in the flowchart of FIG. 12 may be performed in combination with various embodiments of the present disclosure. In one example, the operations disclosed in the flowchart of FIG. 12 may be performed based on at least one of the devices illustrated in FIGS. 14 to 19. In one example, the first device of FIG. 12 may correspond to the first wireless device 100 of FIG. 15 to be described later, and the second device may correspond to the second wireless device 200 of FIG. 15. In another example, the first device of FIG. 12 may correspond to the second wireless device 200 of FIG. 15 to be described later, and the second device may correspond to the first wireless device 100.

In step S1210, the first device according to an embodiment may receive, from the base station, a sidelink grant related to an initial transmission resource and a first retransmission resource of a transport block.

In step S1220, the first device according to an embodiment may transmit, to the second device, a Physical Sidelink Control Channel (PSCCH) and a Physical Sidelink Shared Channel (PSSCH) related to the PSCCH based on the initial transmission resource.

In step S1230, the first device according to an embodiment may determine a PSFCH resource for receiving a Physical Sidelink Feedback Channel (PSFCH) from the second device, based on an index of a slot and a subchannel index related to the PSSCH.

In step S1240, the first device according to an embodiment may receive, from the second device, the PSFCH related to the first PSSCH based on the PSFCH resource.

In step S1250, the first device according to an embodiment may compare a time interval between the PSFCH resource and the first retransmission resource with a minimum processing time required between reception of the PSFCH and retransmission of the transport block.

In step S1260, the first device according to an embodiment may perform sidelink communication with the second device based on the comparison of the time interval and the minimum processing time.

In one embodiment, the transport block may be a transport block for which a sidelink Hybrid Automatic Repeat Request (HARQ) feedback is enabled, and based on the time interval being less than the minimum processing time, the retransmission of the transport block on the first retransmission resource may be dropped by the first device.

In one embodiment, the transport block for which the sidelink HARQ feedback is enabled may be a transport block to which a logical channel (LCH) for which the sidelink HARQ feedback is enabled is mapped.

In one embodiment, based on the time interval being less than the minimum processing time, the transport block for which the sidelink HARQ feedback is enabled may not be transmitted to the second device, and the transport block for which the sidelink HARQ feedback is disabled may be transmitted to the second device.

In one embodiment, based on a Channel State Information (CSI) reporting being enabled, a symbol set related the PSSCH in a sidelink slot may not include an AGC symbol and a symbol for transmission-reception switching.

In one embodiment, the symbol set related to the PSSCH includes may symbol other than the AGC symbol and the symbol for transmission-reception switching, from among sidelink symbols included in the sidelink slot.

In one embodiment, a total number of symbols included in the symbol set related to the PSSCH may be a value obtained by subtracting 2 from a total number of the sidelink symbols included in the sidelink slot.

In one embodiment, the AGC symbol may be a first symbol in time in the sidelink slot, and the symbol for transmission-reception switching may be a last symbol in time in the sidelink slot.

In one embodiment, the total number of symbols included in the symbol set related to the PSSCH may be configured for a resource pool triggering the CSI reporting.

In one embodiment, the first device according to an embodiment may transmit, to the base station, a Physical Uplink Control Channel (PUCCH) related to the sidelink HARQ feedback for the sidelink grant based on the PSFCH. In addition, the first device may receive, from the base station, downlink control information (DCI) including information on a second retransmission resource related to the sidelink grant.

In one embodiment, a cell for transmission of the PUCCH may be determined based on a cell in which reception of the DCI is expected.

In one embodiment, the information on the second retransmission resource may be included in a dynamic grant scrambled with sidelink-configured scheduling-radio network temporary identifier (SL-CS-RNTI).

In one embodiment, the sidelink grant may be received based on an RRC signaling from the base station, and a type of the sidelink grant may be sidelink configured grant (CG) type 1.

According to an embodiment of the present disclosure, a first device configured to perform sidelink communication may be provided. The first device may include at least one memory storing instructions, at least one transceiver, and at least one processor connecting the at least one memory and the at least one transceiver. The at least one processor may be configured to control the at least one transceiver to receive, from a base station, a sidelink grant related to an initial transmission resource and a first retransmission resource of a transport block, control the at least one transceiver to transmit, to a second device, a Physical Sidelink Control Channel (PSCCH) and a Physical Sidelink Shared Channel (PSSCH) related to the PSCCH, based on the initial transmission resource, determine a Physical Sidelink Feedback Channel (PSFCH) resource for receiving a PSFCH from the second device based on an index of a slot and an index of a subchannel related to the PSSCH, control the at least one transceiver to receive, from the second device, the PSFCH related to the PSSCH based on the PSFCH resource, compare a time interval between the PSFCH resource and the first retransmission resource with a minimum processing time required between reception of the PSFCH and retransmission of the transport block, and control the at least one transceiver to perform sidelink communication with the second device based on comparison of the time interval and the minimum processing time. The transport block may be a transport block for which a sidelink Hybrid Automatic Repeat Request (HARQ) feedback is enabled. Based on the time interval being less than the minimum processing time, the retransmission of the transport block on the first retransmission resource may be dropped by the first device.

According to an embodiment of the present disclosure, an apparatus (or chip(set)) configured to control a first user equipment (UE) may be provided. The apparatus may include at least one processor, and at least one computer memory operably connected to the at least one processor and storing instructions. Based on the at least one processor executing the instructions, the first UE may be configured to receive, from a base station, a sidelink grant related to an initial transmission resource and a first retransmission resource of a transport block, transmit, to a second device, a Physical Sidelink Control Channel (PSCCH) and a Physical Sidelink Shared Channel (PSSCH) related to the PSCCH, based on the initial transmission resource, determine a Physical Sidelink Feedback Channel (PSFCH) resource for receiving a PSFCH from the second device based on an index of a slot and an index of a subchannel related to the PSSCH, receive, from the second device, the PSFCH related to the PSSCH based on the PSFCH resource, compare a time interval between the PSFCH resource and the first retransmission resource with a minimum processing time required between reception of the PSFCH and retransmission of the transport block, and perform sidelink communication with the second device based on comparison of the time interval and the minimum processing time. The transport block may be a transport block for which a sidelink Hybrid Automatic Repeat Request (HARQ) feedback is enabled. Based on the time interval being less than the minimum processing time, the retransmission of the transport block on the first retransmission resource may be dropped by the first device.

In one example, the first UE of the above embodiment may refer to the first device described throughout the present disclosure. In one example, the at least one processor, the at least one memory, etc., in the apparatus configured to control the first UE may be implemented as separate sub-chips, or at least two or more components may be implemented through one sub-chip.

According to an embodiment of the present disclosure, a non-transitory computer-readable storage medium storing instructions (or commands) may be provided. The non-transitory computer-readable storage medium may, when executed, cause a first device to: receive, from a base station, a sidelink grant related to an initial transmission resource and a first retransmission resource of a transport block, transmit, to a second device, a Physical Sidelink Control Channel (PSCCH) and a Physical Sidelink Shared Channel (PSSCH) related to the PSCCH, based on the initial transmission resource, determine a Physical Sidelink Feedback Channel (PSFCH) resource for receiving a PSFCH from the second device based on an index of a slot and an index of a subchannel related to the PSSCH, receive, from the second device, the PSFCH related to the PSSCH based on the PSFCH resource, compare a time interval between the PSFCH resource and the first retransmission resource with a minimum processing time required between reception of the PSFCH and retransmission of the transport block, and perform sidelink communication with the second device based on comparison of the time interval and the minimum processing time. The transport block may be a transport block for which a sidelink Hybrid Automatic Repeat Request (HARQ) feedback is enabled. Based on the time interval being less than the minimum processing time, the retransmission of the transport block on the first retransmission resource may be dropped by the first device.

Figure 13:
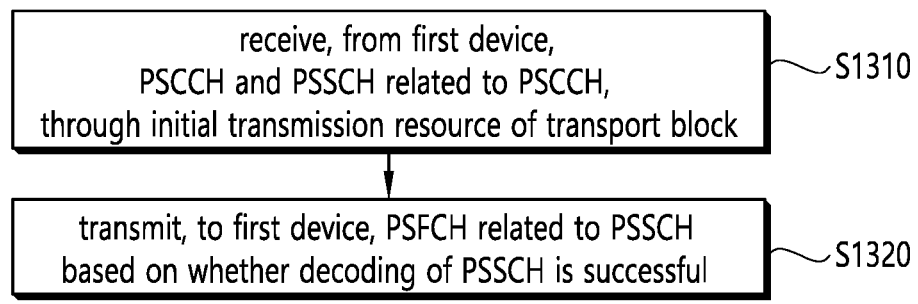
FIG. 13 is a flowchart illustrating a method for a second device to perform sidelink communication according to an embodiment of the present disclosure.

FIG. 13 is a flowchart illustrating a method for a second device to perform sidelink communication according to an embodiment of the present disclosure.

The operations disclosed in the flowchart of FIG. 13 may be performed in combination with various embodiments of the present disclosure. In one example, the operations disclosed in the flowchart of FIG. 13 may be performed based on at least one of the devices illustrated in FIGS. 14 to 19. In one example, the second device of FIG. 13 may correspond to the second wireless device 100 of FIG. 15 to be described later, and the first device may correspond to the first wireless device 100 of FIG. 19. In another example, the second device of FIG. 13 may correspond to the first wireless device 100 of FIG. 15 to be described later, and the first device may correspond to the second wireless device 200.

In step S1310, the second according to an embodiment may receive, from the first device, a PSCCH and a PSSCH related to the PSCCH, through an initial transmission resource of a transport block.

In step S1320, the second according to an embodiment may transmit, to the first device, a PSFCH related to the PSSCH based on whether decoding of the PSSCH is successful.

In one embodiment, a sidelink grant related to the initial transmission resource and a retransmission resource of the transport block may be received by the first device from the base station.

In one embodiment, a time interval between a PSFCH resource related to the PSFCH and the retransmission resource may be compared, by the first device, with a minimum processing time required between reception of the PSFCH by the first device and retransmission of the transport block, In one embodiment, the transport block may be a transport block for which a sidelink Hybrid Automatic Repeat Request (HARQ) feedback is enabled, and based on the time interval being less than the minimum processing time, the retransmission of the transport block on the first retransmission resource may be dropped by the first device.

The transport block for which the sidelink HARQ feedback is enabled may be a transport block to which a logical channel (LCH) for which the sidelink HARQ feedback is enabled is mapped.

In one embodiment, based on the time interval being less than the minimum processing time, the transport block for which the sidelink HARQ feedback is enabled may not be transmitted to the second device, and the transport block for which the sidelink HARQ feedback is disabled may be transmitted to the second device.

In one embodiment, based on a Channel State Information (CSI) reporting being enabled, a symbol set related the PSSCH in a sidelink slot may not include an AGC symbol and a symbol for transmission-reception switching.

In one embodiment, the symbol set related to the PSSCH includes may symbol other than the AGC symbol and the symbol for transmission-reception switching, from among sidelink symbols included in the sidelink slot.

In one embodiment, a total number of symbols included in the symbol set related to the PSSCH may be a value obtained by subtracting 2 from a total number of the sidelink symbols included in the sidelink slot.

In one embodiment, the AGC symbol may be a first symbol in time in the sidelink slot, and the symbol for transmission-reception switching may be a last symbol in time in the sidelink slot.

In one embodiment, the total number of symbols included in the symbol set related to the PSSCH may be configured for a resource pool triggering the CSI reporting.

In one embodiment, the first device according to an embodiment may transmit, to the base station, a Physical Uplink Control Channel (PUCCH) related to the sidelink HARQ feedback for the sidelink grant based on the PSFCH. In addition, the first device may receive, from the base station, downlink control information (DCI) including information on a second retransmission resource related to the sidelink grant.

In one embodiment, a cell for transmission of the PUCCH may be determined based on a cell in which reception of the DCI is expected.

In one embodiment, the information on the second retransmission resource may be included in a dynamic grant scrambled with sidelink-configured scheduling-radio network temporary identifier (SL-CS-RNTI).

In one embodiment, the sidelink grant may be received based on an RRC signaling from the base station, and a type of the sidelink grant may be sidelink configured grant (CG) type 1.

According to an embodiment of the present disclosure, a second device configured to perform sidelink communication may be provided. The second device may include at least one memory storing instructions, at least one transceiver, and at least one processor connecting the at least one memory and the at least one transceiver. The east one processor is configured to: control the at least one transceiver to receive, from a first device, a PSCCH and a PSSCH related to the PSCCH, through an initial transmission resource of a transport block, control the at least one transceiver to transmit, to the first device, a PSFCH related to the PSSCH based on whether decoding of the PSSCH is successful. A sidelink grant related to the initial transmission resource and a retransmission resource of the transport block may be received by the first device from the base station. A time interval between a PSFCH resource related to the PSFCH and the retransmission resource may be compared, by the first device, with a minimum processing time required between reception of the PSFCH by the first device and retransmission of the transport block. The transport block may be a transport block for which a sidelink Hybrid Automatic Repeat Request (HARQ) feedback is enabled, and based on the time interval being less than the minimum processing time, the retransmission of the transport block on the first retransmission resource may be dropped by the first device.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 14:
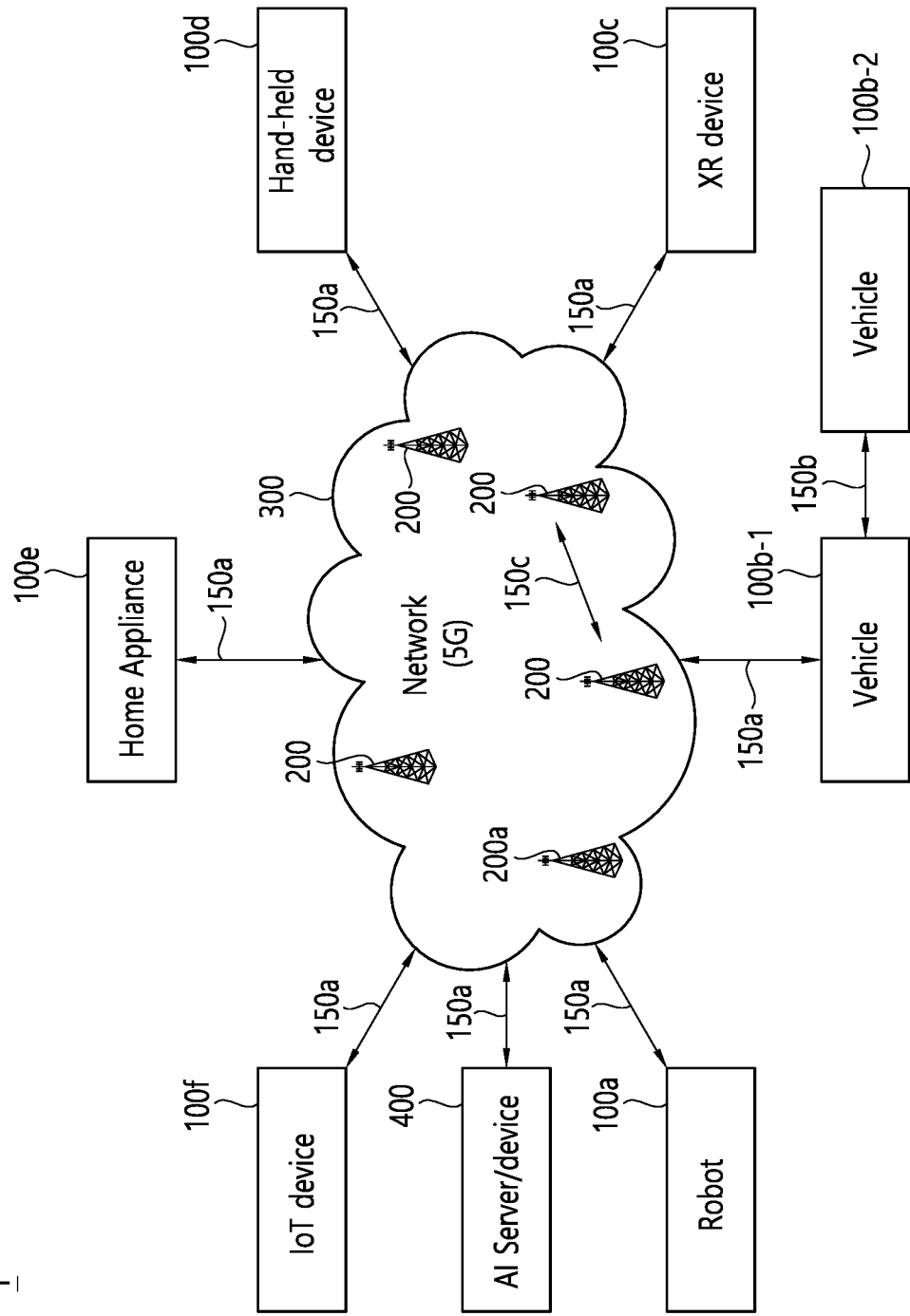
FIG. 14 shows a communication system 1, based on an embodiment of the present disclosure.

FIG. 14 shows a communication system 1, based on an embodiment of the present disclosure.

Referring to FIG. 14, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 15:
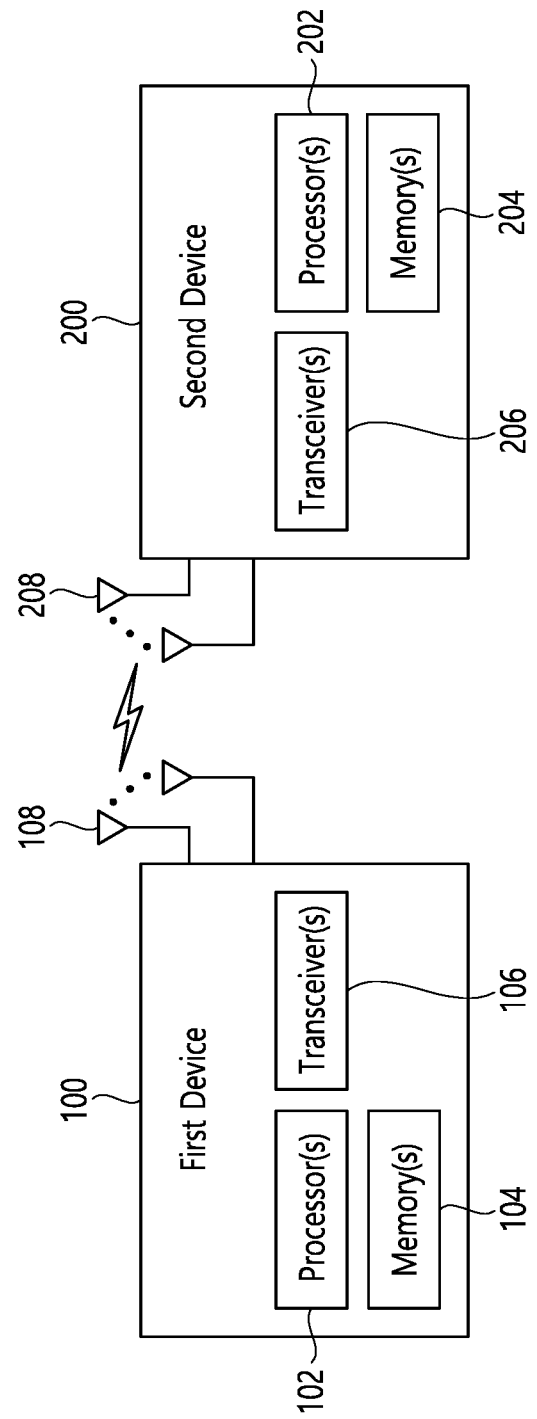
FIG. 15 shows wireless devices, based on an embodiment of the present disclosure.

FIG. 15 shows wireless devices, based on an embodiment of the present disclosure.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 14.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 16:
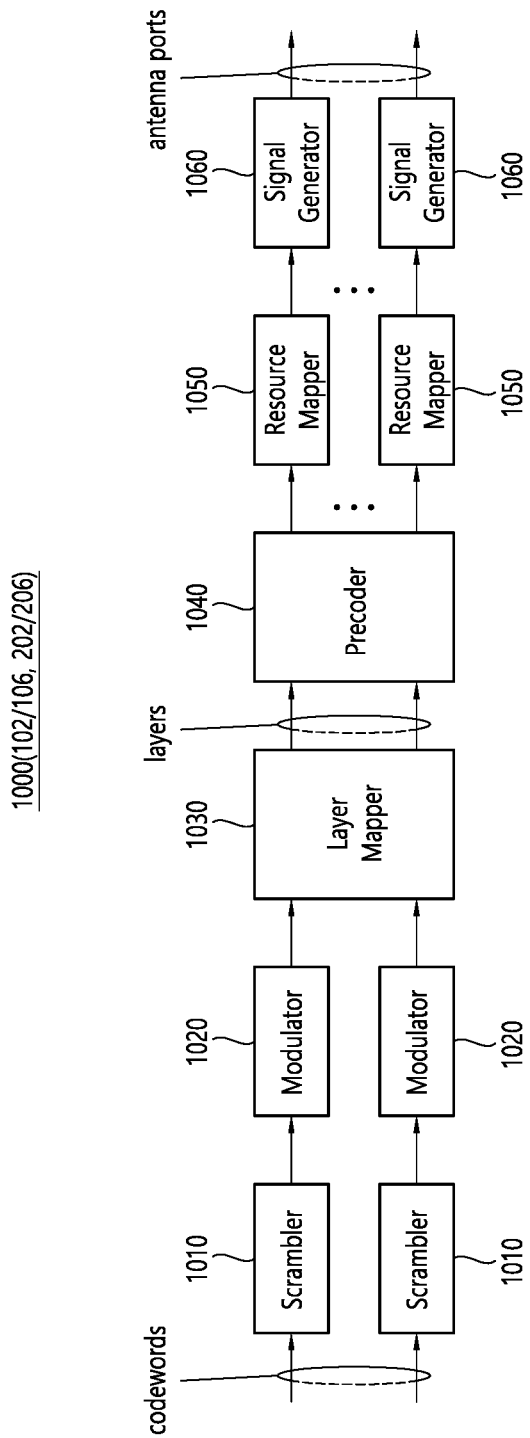
FIG. 16 shows a signal process circuit for a transmission signal, based on an embodiment of the present disclosure.

FIG. 16 shows a signal process circuit for a transmission signal, based on an embodiment of the present disclosure.

Referring to FIG. 16, a signal processing circuit 1000 may include scramblers 1010, modulators 1020, a layer mapper 1030, a precoder 1040, resource mappers 1050, and signal generators 1060. An operation/function of FIG. 16 may be performed, without being limited to, the processors 102 and 202 and/or the transceivers 106 and 206 of FIG. 15. Hardware elements of FIG. 16 may be implemented by the processors 102 and 202 and/or the transceivers 106 and 206 of FIG. 15. For example, blocks 1010 to 1060 may be implemented by the processors 102 and 202 of FIG. 15. Alternatively, the blocks 1010 to 1050 may be implemented by the processors 102 and 202 of FIG. 15 and the block 1060 may be implemented by the transceivers 106 and 206 of FIG. 15.

Codewords may be converted into radio signals via the signal processing circuit 1000 of FIG. 16. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 16. For example, the wireless devices (e.g., 100 and 200 of FIG. 15) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 17:
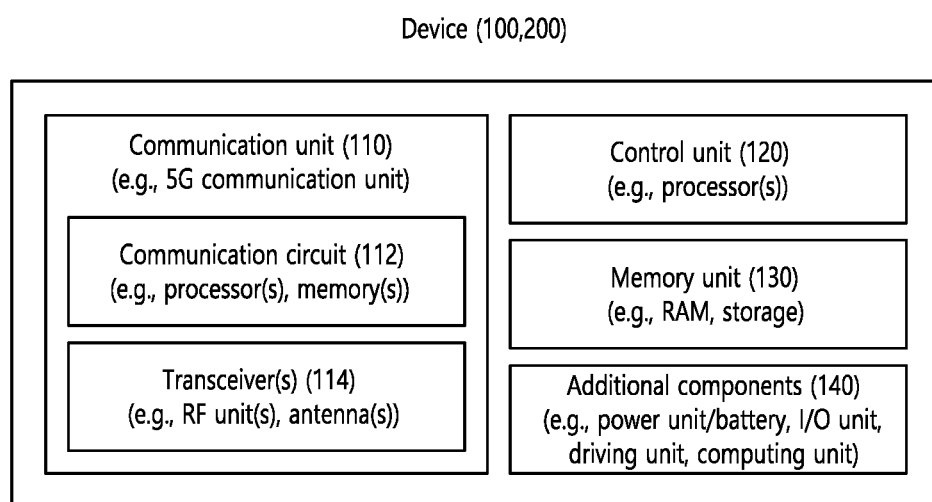
FIG. 17 shows another example of a wireless device, based on an embodiment of the present disclosure.

FIG. 17 shows another example of a wireless device, based on an embodiment of the present disclosure. The wireless device may be implemented in various forms according to a use-case/service (refer to FIG. 14).

Referring to FIG. 17, wireless devices 100 and 200 may correspond to the wireless devices 100 and 200 of FIG. 15 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 14), the vehicles (100b-1 and 100b-2 of FIG. 14), the XR device (100c of FIG. 14), the hand-held device (100d of FIG. 14), the home appliance (100e of FIG. 14), the IoT device (100f of FIG. 14), a digital broadcast terminal, a hologram device, a public safety device, an MTC device, a medicine device, a fintech device (or a finance device), a security device, a climate/environment device, the AI server/device (400 of FIG. 14), the BSs (200 of FIG. 14), a network node, etc. The wireless device may be used in a mobile or fixed place according to a use-example/service.

In FIG. 17, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 17 will be described in detail with reference to the drawings.

Figure 18:
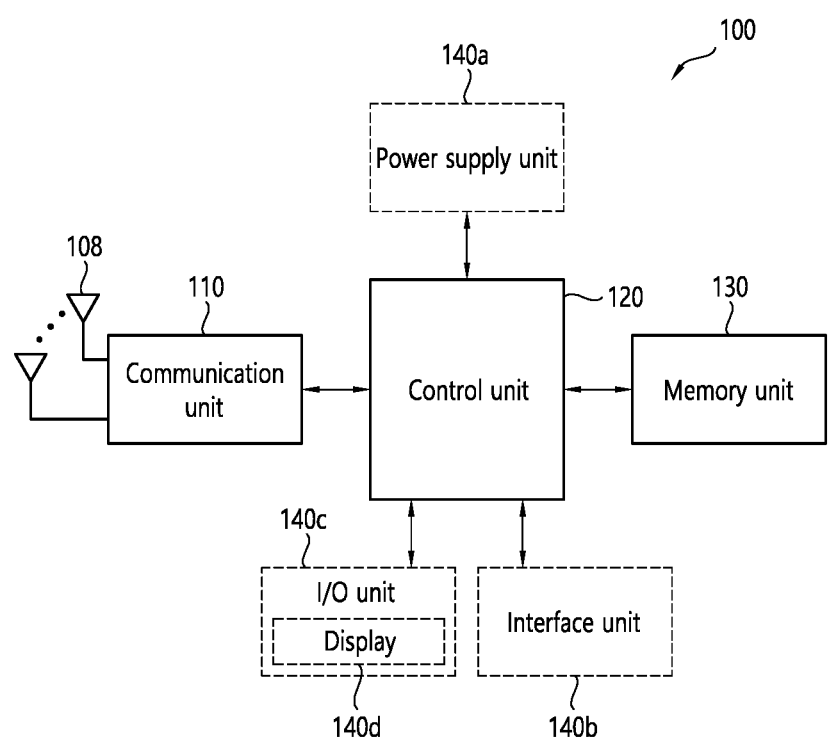
FIG. 18 shows a hand-held device, based on an embodiment of the present disclosure.

FIG. 18 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 18, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 17, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 19:
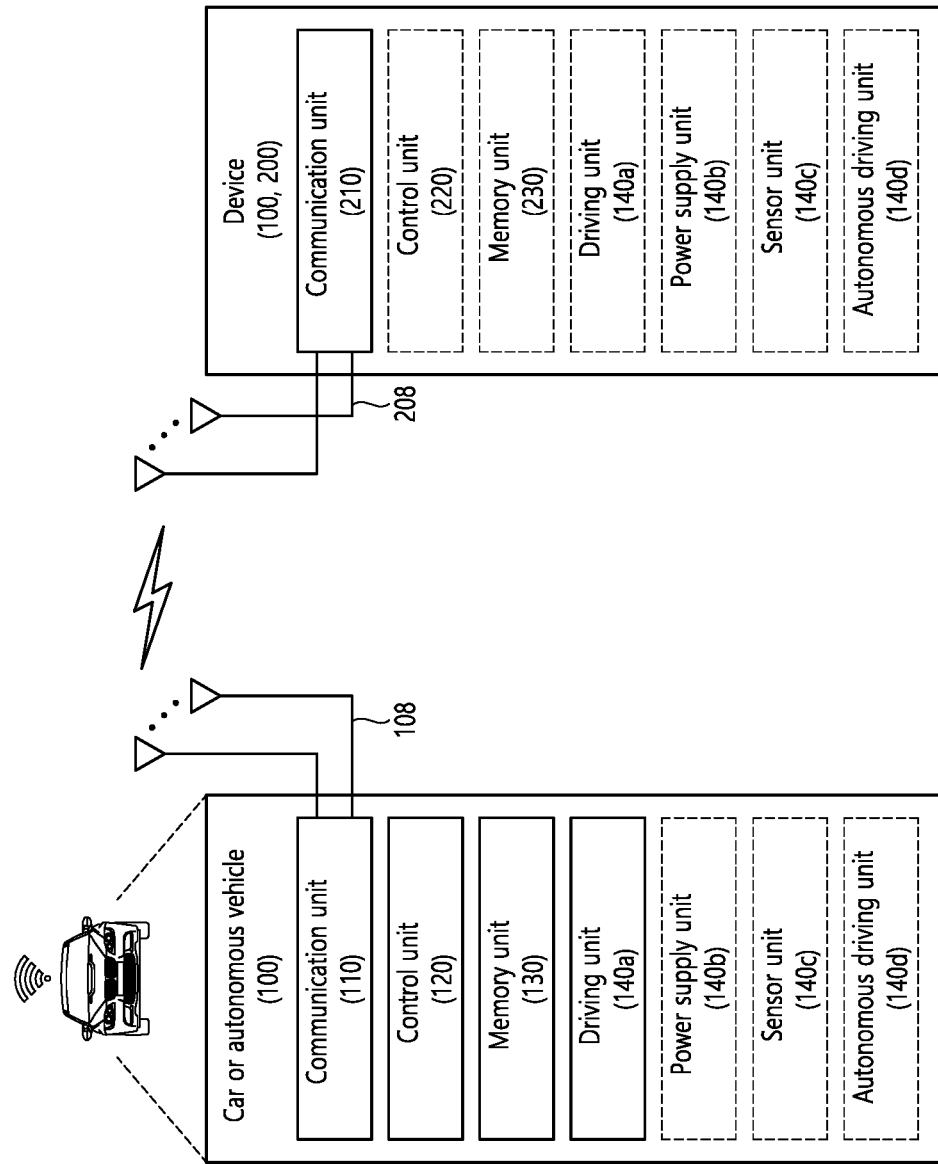
FIG. 19 shows a vehicle or an autonomous vehicle, based on an embodiment of the present disclosure.

FIG. 19 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 19, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 17, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing sidelink communication by a first device, the method comprising:
   receiving, from a base station, a sidelink grant for a sidelink allocation;
   transmitting, to a second device through a first physical sidelink control channel (PSCCH), sidelink control information (SCI);
   transmitting, to the second device through a first physical sidelink shared channel (PSSCH) related to the first PSCCH, a transport block; and
   determining a physical sidelink feedback channel (PSFCH) resource based on information regarding a resource related to the first PSSCH,
   wherein, based on a first sidelink symbol in the sidelink allocation for a second PSSCH for retransmission of the transport block and a second PSCCH which starts earlier than at a symbol where the symbol is defined as a next sidelink symbol starting a preparation time after an end of a last symbol of the PSFCH resource corresponding to the transmission of the first PSSCH for the transport block, the first device skips the retransmission of the second PSSCH and a transmission of the second PSCCH.

2. The method of claim 1, wherein resources for new transmission and retransmission are allocated by the sidelink grant.

3. The method of claim 1, wherein resources for retransmission are allocated by the sidelink grant.

4. The method of claim 1, wherein the transport block is a transport block for which a sidelink hybrid automatic repeat request (HARQ) feedback is enabled.

5. The method of claim 4, wherein the transport block for which the sidelink HARQ feedback is enabled is a transport block obtained based on a logical channel for which the sidelink HARQ feedback is enabled.

6. The method of claim 1, wherein the sidelink grant is a dynamic grant scrambled with sidelink-configured scheduling-radio network temporary identifier (SL-CS-RNTI) or sidelink-radio network temporary identifier (SL-RNTI).

7. The method of claim 1, wherein the sidelink grant is received based on a radio resource control (RRC) signaling from the base station, and
   wherein a type of the sidelink grant is sidelink configured grant type 1.

8. The method of claim 1, wherein the sidelink grant is received based on a radio resource control (RRC) signaling and downlink control information (DCI) from the base station, and
   wherein a type of the sidelink grant is sidelink configured grant type 2.

9. The method of claim 1, wherein the first device is configured with sidelink resource allocation mode 1.

10. A first device adapted to perform sidelink communication, the first device comprising:
    at least one memory storing instructions;
    at least one transceiver; and
    at least one processor connected to the at least one memory and the at least one transceiver, wherein the at least one processor executes the instructions to:
    control the at least one transceiver to receive, from a base station, a sidelink grant for a sidelink allocation;
    control the at least one transceiver to transmit, to a second device through a first physical sidelink control channel (PSCCH), sidelink control information (SCI);
    control the at least one transceiver to transmit, to the second device through a first physical sidelink shared channel (PSSCH) related to the first PSCCH, a transport block; and
    determine a physical sidelink feedback channel (PSFCH) resource based on information regarding a resource related to the first PSSCH,
    wherein, based on a first sidelink symbol in the sidelink allocation for a second PSSCH for retransmission of the transport block and a second PSCCH which starts earlier than at a symbol where the symbol is defined as a next sidelink symbol starting a preparation time after an end of a last symbol of the PSFCH resource corresponding to the transmission of the first PSSCH for the transport block, the first device skips the retransmission of the second PSSCH and a transmission of the second PSCCH.

11. The first device of claim 10, wherein resources for new transmission and retransmission are allocated by the sidelink grant.

12. The first device of claim 10, wherein resources for retransmission are allocated by the sidelink grant.

13. The first device of claim 10, wherein the transport block is a transport block for which a sidelink hybrid automatic repeat request (HARQ) feedback is enabled.

14. A processing device adapted to control a first device performing sidelink communication, the processing device comprising:
- at least one processor; and
- at least one memory operably connected to the at least one processor and storing instructions, wherein the at least one processor executes the instructions to:
- receive, from a base station, a sidelink grant for a sidelink allocation;
- transmit, to a second device through a first physical sidelink control channel (PSCCH), sidelink control information (SCI);
- transmit, to the second device through a first physical sidelink shared channel (PSSCH) related to the first PSCCH, a transport block; and
- determine a physical sidelink feedback channel (PSFCH) resource based on information regarding a resource related to the first PSSCH,
- wherein, based on a first sidelink symbol in the sidelink allocation for a second PSSCH for retransmission of the transport block and a second PSCCH which starts earlier than at a symbol where the symbol is defined as a next sidelink symbol starting a preparation time after an end of a last symbol of the PSFCH resource corresponding to the transmission of the first PSSCH for the transport block, the first device skips the retransmission of the second PSSCH and a transmission of the second PSCCH.

15. The processing device of claim 14, wherein resources for new transmission and retransmission are allocated by the sidelink grant.

16. The processing device of claim 14, wherein resources for retransmission are allocated by the sidelink grant.

17. The processing device of claim 14, wherein the transport block is a transport block for which a sidelink hybrid automatic repeat request (HARQ) feedback is enabled.

18. The method of claim 1, wherein the first sidelink symbol is a sidelink symbol that is allocated first in the sidelink allocation for the second PSSCH for the retransmission of the transport block and the second PSCCH associated with the second PSSCH.

19. The first device of claim 10, wherein the first sidelink symbol is a sidelink symbol that is allocated first in the sidelink allocation for the second PSSCH for the retransmission of the transport block and the second PSCCH associated with the second PSSCH.

20. The processing device of claim 14, wherein the first sidelink symbol is a sidelink symbol that is allocated first in the sidelink allocation for the second PSSCH for the retransmission of the transport block and the second PSCCH associated with the second PSSCH.

* * * * *